UNITED STATES PATENT OFFICE.

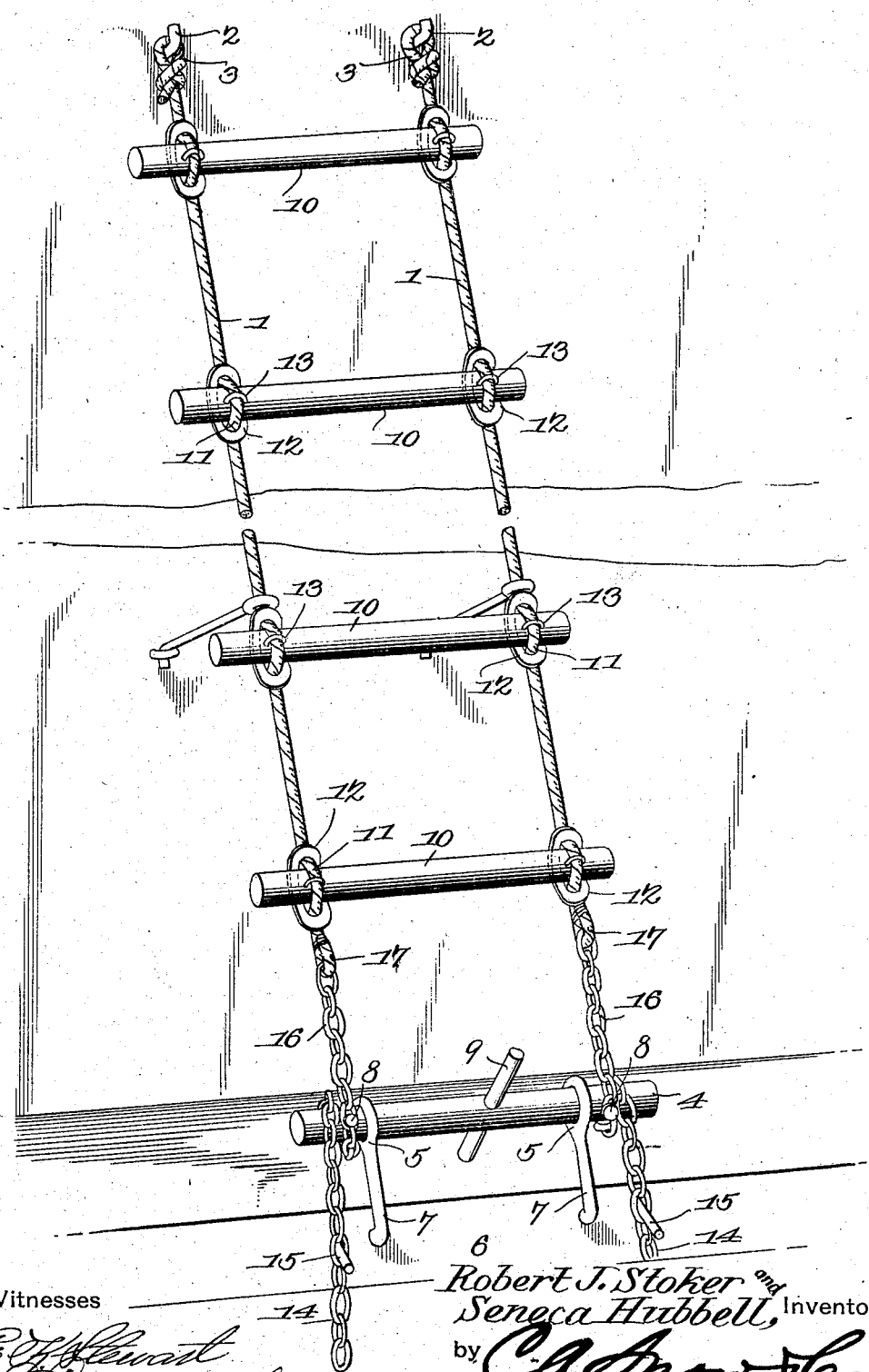

ROBERT J. STOKER, OF YORK, AND SENECA HUBBELL, OF BRADSHAW, NEBRASKA.

LADDER OR PERCH.

No. 806,597.　　　　Specification of Letters Patent.　　　Patented Dec. 5, 1905.

Application filed June 28, 1905. Serial No. 267,435.

*To all whom it may concern:*

Be it known that we, ROBERT J. STOKER, residing at York, and SENECA HUBBELL, residing at Bradshaw, in the county of York and State of Nebraska, citizens of the United States, have invented a new and useful Ladder or Perch, of which the following is a specification.

This invention relates to structures adapted for use as ladders, driers, and perches for fowls or for any use where suspended bars are necessary or desirable.

The object of this invention is to provide a new and improved fastening for securing the rungs, bars, or perches to a suspending-cable.

A further object of this invention is to provide a new and improved tightening device for the cable and means for fastening the cable in a tightened position.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of the invention.

The drawing represents a perspective view of our improved structure mounted in an oblique position and as so mounted adapted for use as a ladder, a drier, or a perch for fowls.

In its preferred embodiment this invention comprises a plurality of cables 1, which may be rope, twisted wire, plain wire, chain, or other approved cable. The cable 1 is secured to any stationary abutment where it is to be used in any approved manner, as by means of the hooks 2, engaging with loops 3, formed in the ends of the cables. For securing the lower ends of the cables a roller 4 or other form of winding-drum is mounted to rotate in any approved manner, as in the rings 5, secured to an abutment 6 by means of the arms 7. The cable is secured to the roller in any approved manner, as by the rivets 8, and a winding-lever 9 is employed for winding the cable about the roller. Cross-bars 10 are provided extending between the cables and are secured to the cables by being disposed within an offset portion 11 of the cables and by having a link 12 embracing their opposite sides and engaging with the cables upon each side of the offset. To prevent accidental displacement of the bars 10 when the cables 1 are loose, staples 13 may be driven into the bars and across and embracing the cables; but it will be understood that such staples are not necessary when the structure is in use, as the strain of the cables will firmly clamp the bars between the cables and the link, and the greater the strain placed upon the bars and the cable the more firmly will the bars be clamped. When the bars have been secured to the cable, the roller 4 is rotated and the cables drawn taut, after which the free ends 14 of the cables are secured in any approved manner, as by engagement with pins 15, rigidly secured to the lower abutment.

While we have shown here the lower ends of the cables formed of chains 16, connected with the cables 1 by means of a loop 17, it is obvious that the cables 1 may be extended to and about the roller 4 or the chains 16 may be extended throughout the length of the structure and replace the cables 1 and engage with the cross-bars 10.

From the foregoing description, taken in connection with the drawing, the use, operation, and advantages of the structure described will be fully and clearly understood.

Having thus described the invention, what is claimed is—

1. A device of the class described comprising a rung, a cable secured to the rung and provided at one end with means for permanent attachment, arms provided at one end with means for permanent attachment and with rings at the opposite ends, a roller rotatably mounted in the rings and with the free end of the cable wound about and secured thereto, means to rotate the roller and means to prevent a backward movement of the roller.

2. A device of the class described comprising a rung, a cable provided at one end with means for permanent attachment and having an offset embracing the rung, a link disposed opposite to and engaging the cable upon each side of the offset, arms provided at one end with means for permanent attachment and with rings at the opposite ends, a roller rotatably mounted in the rings and with the free end of the cable wound about and secure thereto, means to rotate the roller and means carried by the cable to prevent a backward rotation of the roller.

In testimony that we claim the foregoing as our own we have hereto affixed our signatures in the presence of two witnesses.

ROBERT J. STOKER.
    SENECA HUBBELL.

Witnesses:
 CHARLES O. STEWART,
 W. C. MUIRHEAD.